United States Patent
Tanigawa et al.

(10) Patent No.: US 11,472,096 B2
(45) Date of Patent: Oct. 18, 2022

(54) FILAMENT WINDING APPARATUS

(71) Applicant: Murata Machinery, Ltd., Kyoto (JP)

(72) Inventors: Motohiro Tanigawa, Kyoto (JP); Daigoro Nakamura, Kyoto (JP); Hirotaka Wada, Kyoto (JP); Tadashi Uozumi, Kyoto (JP); Hideo Shitamoto, Kyoto (JP); Tatsuhiko Nishida, Kyoto (JP); Masatsugu Goyude, Kyoto (JP); Tetsuya Matsuura, Kyoto (JP); Shu Ikezaki, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 256 days.

(21) Appl. No.: 16/642,054

(22) PCT Filed: Aug. 10, 2018

(86) PCT No.: PCT/JP2018/030011
§ 371 (c)(1),
(2) Date: Feb. 26, 2020

(87) PCT Pub. No.: WO2019/064960
PCT Pub. Date: Apr. 4, 2019

(65) Prior Publication Data
US 2020/0299098 A1  Sep. 24, 2020

(30) Foreign Application Priority Data

Sep. 27, 2017  (JP) .............................. JP2017-186430

(51) Int. Cl.
| | |
|---|---|
| B29C 53/00 | (2006.01) |
| B29C 53/80 | (2006.01) |
| B65H 54/02 | (2006.01) |
| B65H 54/28 | (2006.01) |
| B65H 57/12 | (2006.01) |
| B29C 63/24 | (2006.01) |

(Continued)

(52) U.S. Cl.
CPC ........ *B29C 53/8016* (2013.01); *B29C 53/602* (2013.01); *B29C 53/64* (2013.01);
(Continued)

(58) Field of Classification Search
None
See application file for complete search history.

(56) References Cited

U.S. PATENT DOCUMENTS

| | | | |
|---|---|---|---|
| 4,460,422 A * | 7/1984 | Michael | .................. B29C 53/66 156/175 |
| 5,698,066 A | 12/1997 | Johnson et al. | |

(Continued)

FOREIGN PATENT DOCUMENTS

| | | |
|---|---|---|
| DE | 691 22 064 | 4/1997 |
| JP | 2005-154908 A | 6/2005 |

(Continued)

*Primary Examiner* — Emmanuel M Marcelo
(74) *Attorney, Agent, or Firm* — DLA Piper LLP (US)

(57) ABSTRACT

A helical winding unit of a filament winding apparatus includes guide members guiding fiber bundles F to a liner, a movement mechanism moving the guide members, and a rotation mechanism rotating the guide members. Each of the guide members includes two side walls and guide portions fixed between the two side walls. As the guide portions, a first guide portion having a first guide surface and a second guide portion having a second guide surface and provided downstream of the first guide portion are provided. In the height direction, the first guide surface is oriented to one side. The second guide surface is oriented to the other side in the height direction and provided on the other side of the first guide surface.

20 Claims, 8 Drawing Sheets

(51) Int. Cl.
*B29C 63/00* (2006.01)
*B29C 53/64* (2006.01)
*B29C 53/60* (2006.01)
*B29C 70/54* (2006.01)

(52) U.S. Cl.
CPC .......... *B29C 63/0073* (2013.01); *B29C 63/24* (2013.01); *B29C 70/54* (2013.01); *B65H 54/026* (2013.01); *B65H 54/2836* (2013.01); *B65H 57/12* (2013.01)

(56) References Cited

U.S. PATENT DOCUMENTS

| | | |
|---|---|---|
| 2008/0197229 A1 | 8/2008 | Uozumi et al. |
| 2009/0127373 A1 | 5/2009 | Uozumi et al. |
| 2010/0032510 A1 | 2/2010 | Tanigawa et al. |
| 2013/0306783 A1* | 11/2013 | Tanigawa ............... B65H 57/00 242/476.7 |
| 2014/0224918 A1* | 8/2014 | Tanigawa ............... B65H 59/28 242/419.4 |
| 2015/0290882 A1* | 10/2015 | Hatta ..................... B65H 59/28 242/419.4 |
| 2016/0264375 A1 | 9/2016 | Hatta |

FOREIGN PATENT DOCUMENTS

| | | |
|---|---|---|
| JP | 2008-195000 A | 8/2008 |
| JP | 2009-119732 A | 6/2009 |
| JP | 2010-036461 A | 2/2010 |
| JP | 2016-165850 A | 9/2016 |
| WO | 2012/043342 A1 | 4/2012 |

\* cited by examiner

FILAMENT WINDING APPARATUS

TECHNICAL FIELD

This disclosure relates to a filament winding apparatus configured to wind fiber bundles onto a liner.

BACKGROUND

Each of International Publication No. WO 2012/43342 and Japanese Laid-Open Patent Publication No. 2008-195000 discloses a filament winding apparatus configured to wind fiber bundles onto a liner. The filament winding apparatus includes a helical winding head which helical-winds fiber bundles onto a liner. The helical winding head recited in WO '342 includes guide members that radially extend in radial direction of the liner and guide the respective fiber bundles to the liner. The helical winding head includes a movement mechanism configured to move each guide member in the radial direction, a rotation mechanism configured to rotate each guide member about a rotational axis parallel to the longitudinal direction of each guide member, and a controller.

Each guide member includes two side portions opposing each other and a bottom portion provided between the two side portions, where a running fiber bundle is guided while being in contact with the bottom portion. In other words, the guide member is U-shaped in cross section and the internal space of the guide member is open to the outside. The fiber bundle may drop off when the running fiber bundle is lifted up from the bottom portion. This problem is suppressed by the following arrangement. As the controller controls the rotation mechanism in accordance with, for example, the direction of winding of the fiber bundles onto the liner, the orientations of the guide members are adjusted so that the running fiber bundles are pressed onto the bottom portions.

In addition to the above, the guide member is provided with a drop-off prevention member which is formed by a heat-shrinkable tube or the like. The drop-off prevention member is adhered to a part in the longitudinal direction of the guide member, and prevents the fiber bundle from dropping off from the guide member when the fiber bundle is not running, e.g., during maintenance of the helical winding head.

A helical winding head recited in JP '000 includes a guide ring in which guide holes are formed to guide the respective fiber bundles to the liner and opening guides provided downstream of the guide holes in the running direction of the fiber bundles. Each opening guide includes two opening rollers aligned in the running direction. Because the fiber bundle runs between the two opening rollers while being in contact with the opening rollers, the fiber bundle does not drop off from the running path of the fiber bundle.

In the guide member recited in WO '342, when, for example, there is a failure in the control of the rotation of the guide member, the running fiber bundle may no longer be pressed onto the bottom portion and lifted up from the bottom portion. The drop-off prevention member is provided primarily to prevent the drop-off of the fiber bundle which is not running. A predetermined tension is typically applied to a running fiber bundle. On this account, when a running fiber bundle is lifted up from the bottom surface and hits the drop-off prevention member, the drop-off prevention member may be damaged by the fiber bundle, and the fiber bundle may eventually drop off from the guide member.

Meanwhile, when the opening rollers of JP '000 are applied to the guide member of WO '342, the guide member is required to be large in size, because it is difficult to downsize the rollers in accordance with the size of the guide member. For example, after the guide members are moved inward in the radial direction of the liner by the movement mechanism, the distance between neighboring guide members is short and the guide members may interfere with each other.

It could therefore be helpful to prevent a running fiber bundle from dropping off from a guide member, while preventing increase in size of the guide member.

SUMMARY

We thus provide:

A filament winding apparatus includes a helical winding head configured to helical-wind fiber bundles onto a liner, the helical winding head including: guide members extending in radial directions of the liner in a radial manner and guide the respective fiber bundles to the liner; a movement mechanism configured to move each of the guide members in the radial direction; and a rotation mechanism configured to rotate each of the guide members about an axis parallel to a direction in which each of the guide members extends, each of the guide members including: two side walls which oppose each other and extend in the radial direction; and guide portions fixed between the two side walls, a running fiber bundle making contact with the guide portions, the guide portions including: a first guide portion in which a first guide surface is formed, the running fiber bundle making contact with the first guide surface; and a second guide portion in which a second guide surface is formed, the running fiber bundle making contact with the second guide surface and the second guide portion being downstream of the first guide portion in a fiber bundle running direction, a direction orthogonal to a longitudinal direction of the side walls being defined as a height direction of the side walls, the first guide surface being oriented to one side in the height direction, and the second guide surface being oriented to the other side in the height direction and being provided on the other side of the first guide surface in the height direction.

The fiber bundles are guided to the liner by the guide members provided in a radial manner. Each guide member is movable in the radial direction of the liner and rotatable about an axis parallel to the direction in which the guide member extends. The fiber bundle is guided while making contact with the first guide surface and the second guide surface which is oriented in the opposite direction to the first guide surface in the height direction. Because of this arrangement, even if the running fiber bundle is lifted up toward the one side in the height direction of the side walls, the lift-up of the fiber bundle is suppressed by the second guide surface, with the result that the drop-off of the fiber bundle is prevented. Meanwhile, when the fiber bundle is lifted up toward the other side in the height direction of the side walls, the lift-up of the fiber bundle is suppressed by the first guide surface, with the result that the drop-off of the fiber bundle is prevented. In the direction orthogonal to both the longitudinal direction and the height direction of the side walls, the two side walls prevent the fiber bundle from dropping off. Furthermore, because of the positional relationship between the first guide surface and the second guide surface in the height direction of the side walls, the guide portions can be arranged to be at least partially overlapped with one another in the height direction of the side walls. It is therefore possible to suppress the increase in size of the side walls in the height direction.

In addition to the above, the guide portions are fixed to the two side walls. In other words, the guide portions are not rollers rotated by the running fiber bundle. It is therefore possible to arrange the guide portions to be small.

Because of the above, it is possible to prevent the running fiber bundle from dropping off from the guide member, while preventing increase in size of the guide member.

The filament winding apparatus described above may be arranged such that a downstream end portion in the fiber bundle running direction of the first guide portion is curved toward the other side in the height direction toward the downstream side in the fiber bundle running direction.

Because the fiber bundle is able to smoothly run toward the second guide surface along the curved surface of the downstream end portion of the first guide surface, the fiber bundle is less likely to be damaged when the fiber bundle moves from the first guide portion to the second guide portion.

The filament winding apparatus described above may be arranged such that an upstream end portion in the fiber bundle running direction of the second guide portion is curved toward the one side in the height direction toward the upstream side, and a downstream end portion in the fiber bundle running direction of the second guide portion is curved toward the one side in the height direction toward the downstream side.

The fiber bundle is allowed to smoothly run along the curved surface when reaching the upstream end portion of the second guide surface or when leaving the downstream end portion of the second guide surface, with the result that the fiber bundle is less likely to be damaged.

The filament winding apparatus described above may be arranged such that the guide portions further include a third guide portion in which a third guide surface is formed, the running fiber bundle making contact with the third guide surface and the third guide portion being downstream of the second guide portion in the fiber bundle running direction, the third guide surface being oriented to the one side in the height direction and provided on the one side of the second guide surface in the height direction.

The fiber bundle is guided in a slightly meandering manner from the first guide portion to the third guide portion. On this account, the fiber bundle further stably runs.

The filament winding apparatus described immediately above may be arranged such that an upstream end portion in the fiber bundle running direction of the third guide portion is curved toward the other side in the height direction toward the upstream side, and a downstream end portion in the fiber bundle running direction of the third guide portion is curved toward the other side in the height direction toward the downstream side.

The fiber bundle is allowed to smoothly run along the curved surface when reaching the upstream end portion of the third guide surface or when leaving the downstream end portion of the third guide surface, with the result that the fiber bundle is less likely to be damaged.

The filament winding apparatus described above may be arranged so that the height of each of the two side walls in the height direction decreases inward in the radial direction.

When the guide members are gathered by the movement mechanism to the inner side in the radial direction, each guide member is rotated by the rotation mechanism so that the height direction of the side walls of the guide member is along the circumferential direction of the liner. As a result, the guide members are further less likely to interfere with each other.

The filament winding apparatus described above may be arranged such that the guide members are made of steel.

The guide members are made of steel and have high strength and rigidity. For this reason, even if the tension of the fiber bundle acts on the guide member, the guide member is less likely to be damaged, thanks to the high strength. Furthermore, because the guide member is less likely to warp thanks to the high rigidity, interference between the guide members is suppressed.

The filament winding apparatus described above may be arranged such that the guide portions are integrally formed with the two side walls.

The guide portions are integrally formed with the two side walls. (In other words, there are no joints between these portions.) The strength of the guide member is therefore high compared to a guide member formed by adhesion, welding or the like (i.e., having joints).

REFERENCE SIGNS LIST 1 filament winding apparatus
40 helical winding unit (helical winding head)
43 guide member
47 movement mechanism
48 rotation mechanism
81 side wall
82 guide portion
83 first guide portion
83a first guide surface
84 second guide portion
84a second guide surface
85 third guide portion
85a third guide surface
F fiber bundle
L liner

DETAILED DESCRIPTION

The following will describe an example with reference to FIGS. 1 to 7B. Hereinafter, forward, rearward, leftward, and rightward directions shown in FIG. 1 will be consistently used for convenience of explanation. Furthermore, the direction orthogonal to the forward, rearward, leftward, and rightward directions is referred to as an up-down direction in which the gravity acts.

Outline of Filament Winding Apparatus

Figure 1:
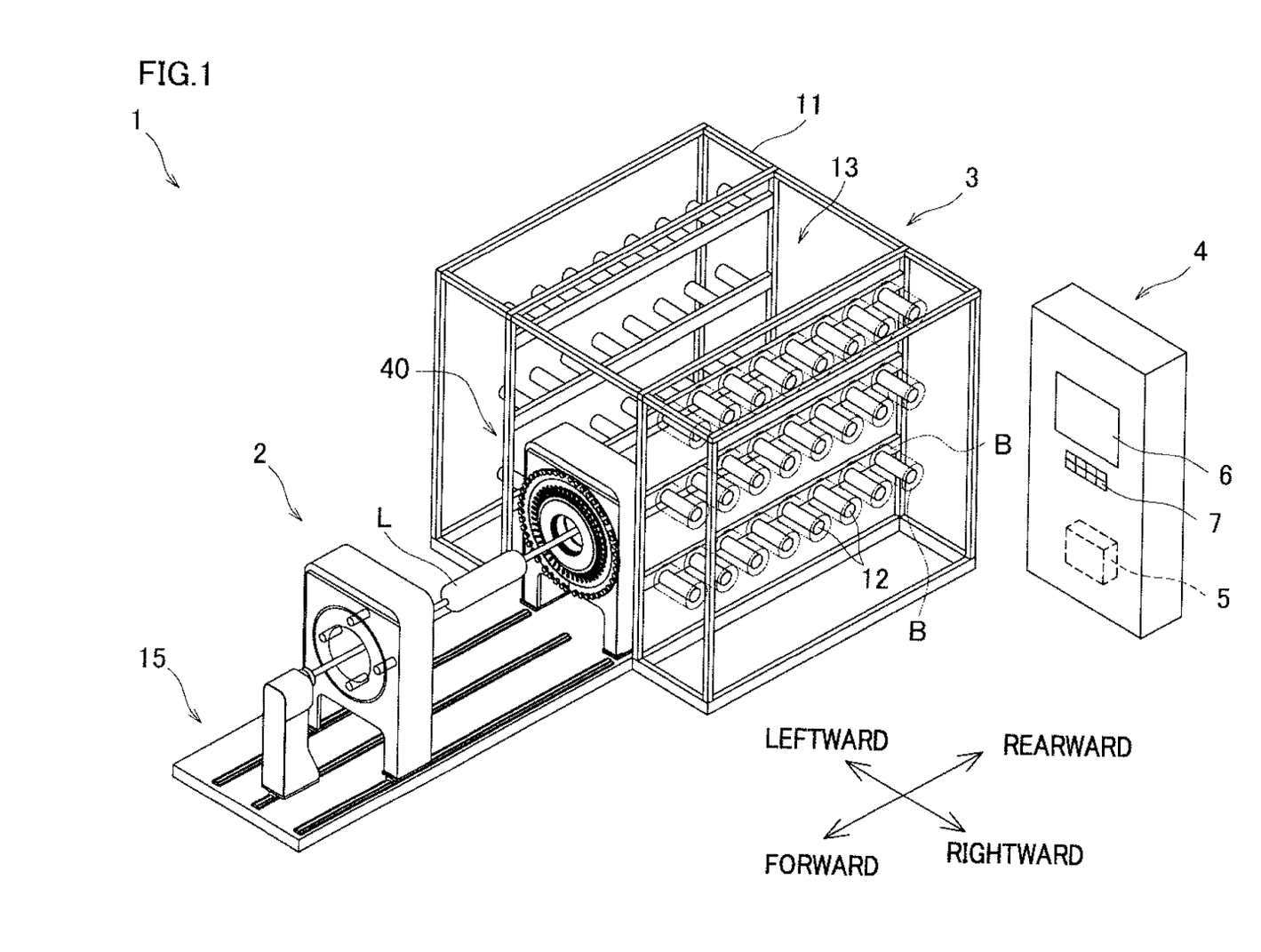
FIG. 1 is a perspective view of a filament winding apparatus of an example.

To begin, a filament winding apparatus 1 will be outlined with reference to FIG. 1. The filament winding apparatus 1 includes a winder 2, a creel stand 3, and a control panel 4.

The winder 2 winds fiber bundles onto a liner L. Each fiber bundle is formed by, for example, impregnating a thermosetting synthetic resin material into a fiber material such as carbon fiber. The liner L on which the fiber bundles are wound is made of, for example, high strength aluminum or the like when a pressure tank is manufactured. The liner L includes a cylindrical portion and dome portions formed on the respective sides of the cylindrical portion. The winder 2 will be detailed later.

The creel stand 3 supplies fiber bundles to a later-described helical winding unit 40. The creel stand 3 includes a supporting frame 11 and bobbin supporters 12 supported by the supporting frame 11. The supporting frame 11 is substantially symmetrical in the left-right direction. At a central part of the supporting frame 11 in the left-right direction, an installation space 13 where the winder 2 is partially installed is formed. (Details of the inside of the installation space 13 are not shown.) Each of the bobbin supporters 12 rotatably supports a bobbin B on which a fiber bundle to be supplied to the helical winding unit 40 is wound.

The control panel 4 includes a controller 5, a display 6, and an operation unit 7. The controller 5 controls each part of the winder 2. The display 6 displays, for example, a winding condition of fiber bundles onto the liner L by the winder 2. The operation unit 7 is used to allow an operator to input, for example, a winding condition of the winder 2 to the controller 5.

Structure of the Winder

Figure 2:
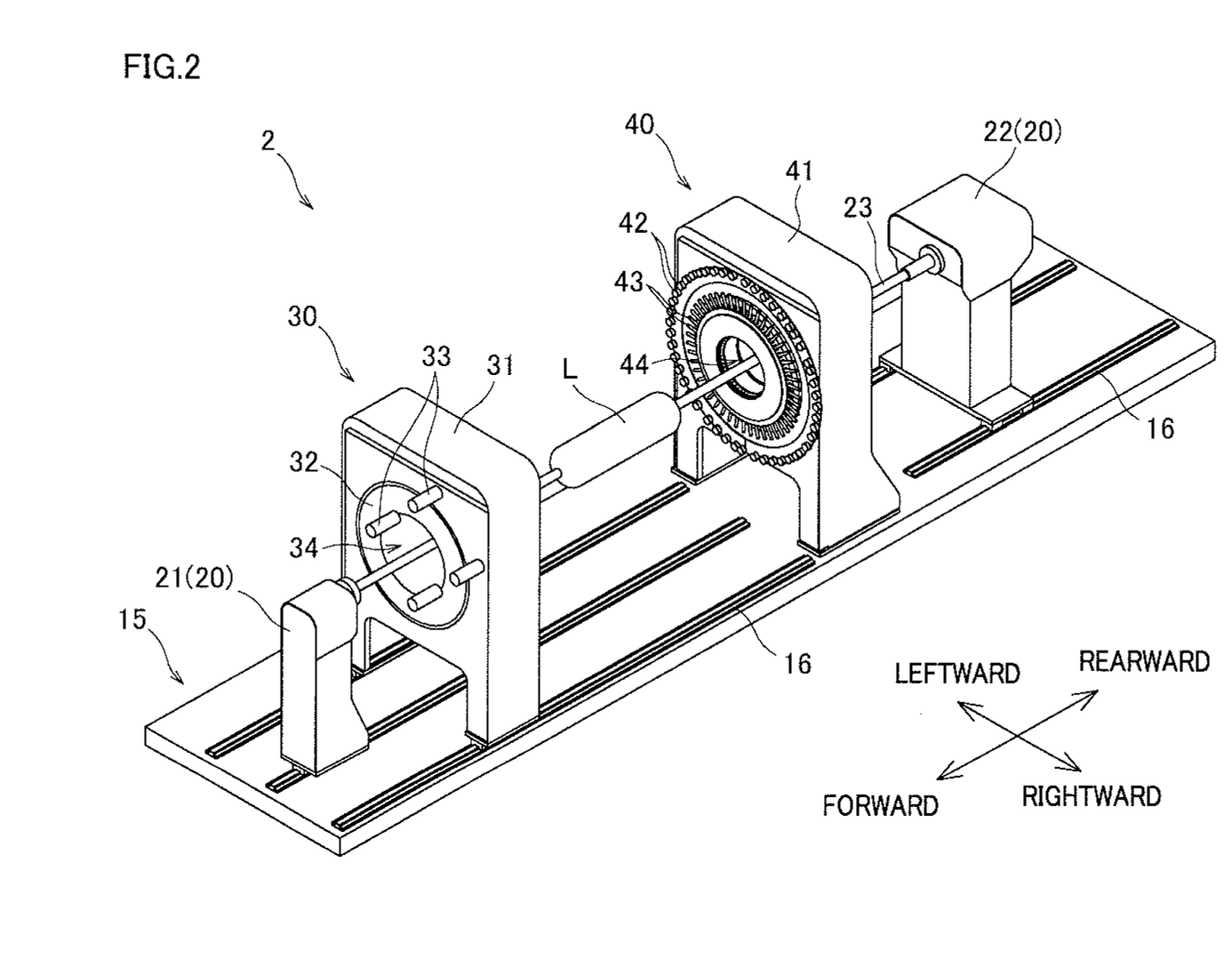
FIG. 2 is a perspective view of a winder.
Figure 3A:
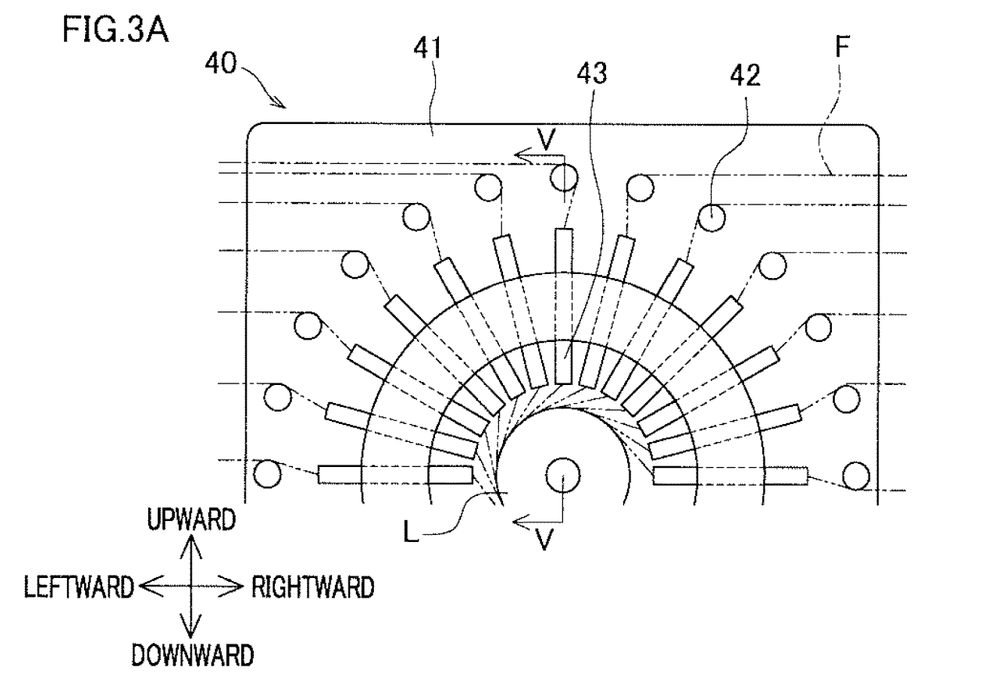
FIGS. 3A and 3B each show a front view of an upper part of a helical winding unit.
Figure 3B:
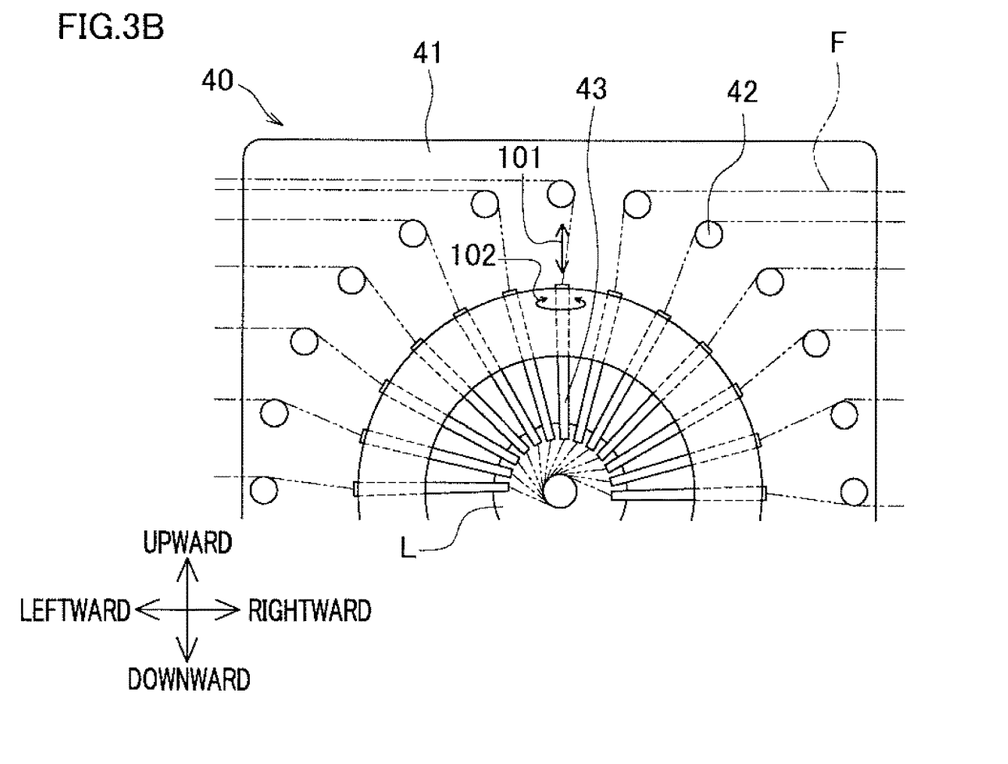
Figure 4:
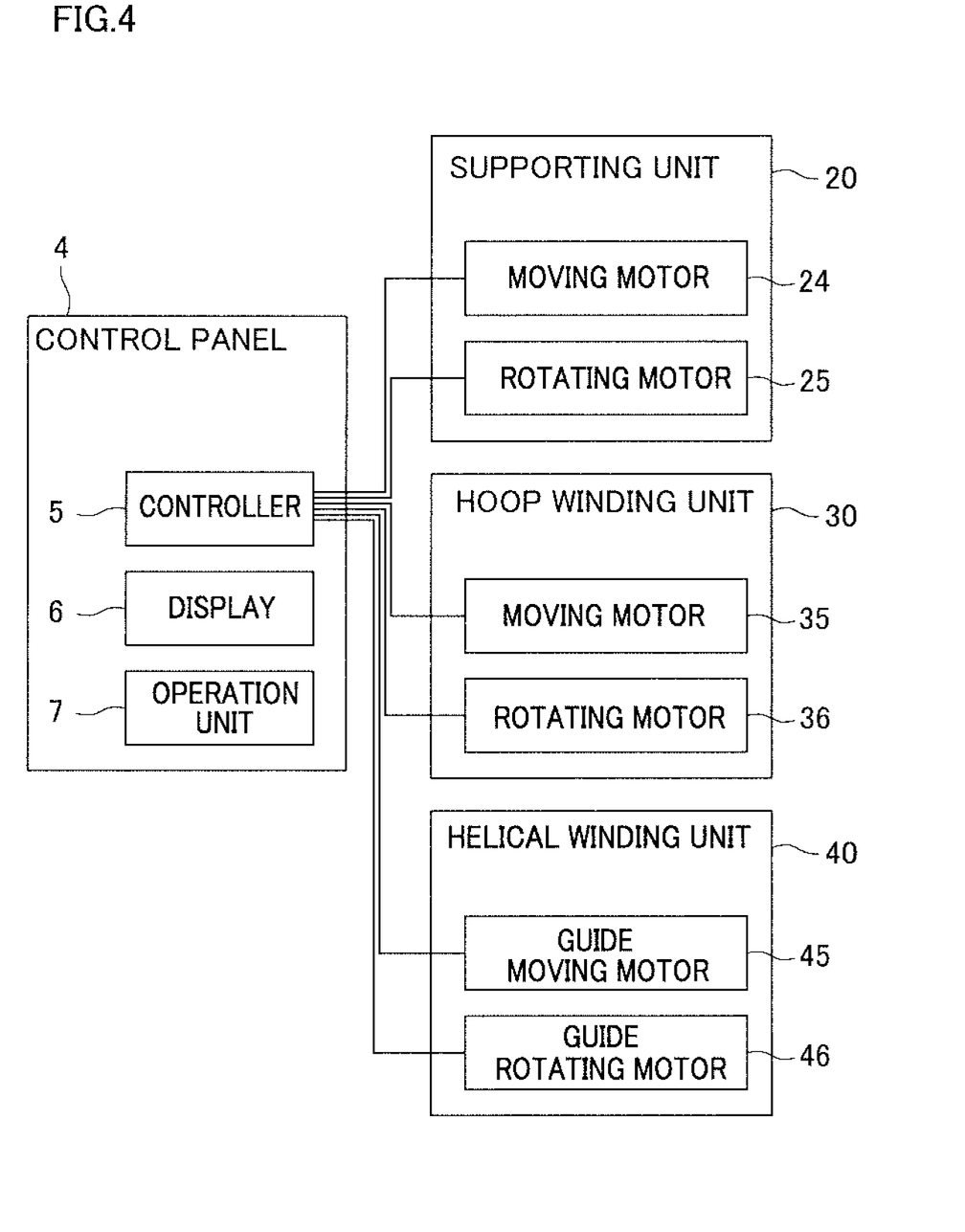
FIG. 4 is a block diagram of an electrical configuration of the filament winding apparatus.

The following will describe the structure of the winder 2 with reference to FIGS. 2 to 4. FIG. 2 is a perspective view of the winder 2. FIGS. 3A and 3B are front views of a later-described helical winding unit. FIG. 4 is a block diagram of an electric configuration of the filament winding apparatus 1. The winder 2 includes a base 15, supporting units 20 (a first supporting unit 21 and a second supporting unit 22), a hoop winding unit 30, and a helical winding unit 40 (helical winding head).

The base 15 supports the supporting units 20, the hoop winding unit 30, and the helical winding unit 40. The base 15 extends in the front-rear direction. On the base 15, the first supporting unit 21, the hoop winding unit 30, the helical winding unit 40, and the second supporting unit 22 are provided in this order from the front-side to the rear-side. On the top surface of the base 15, rails 16 are provided to extend in the front-rear direction. The supporting units 20 and the hoop winding unit 30 are provided on the rails 16 and movable in the front-rear direction along the rails 16. The helical winding unit 40 is fixed to the base 15, at a front end portion of the installation space 13 of the creel stand 3 as shown in FIG. 1.

The liner supporting units 20 include the first supporting unit 21 provided in front of the hoop winding unit 30 and the second supporting unit 22 provided behind the helical winding unit 40. The supporting units 20 support the liner L so that the liner L is rotatable about a supporting shaft 23 that extends in the front-rear direction. The supporting units 20 include a moving motor 24 that moves the supporting units 20 in the front-rear direction along the rails 16 and a rotating motor 25 which rotates the liner L as shown in FIG. 4. The moving motor 24 and the rotating motor 25 are controlled by the controller 5.

The hoop winding unit 30 hoop-winds the fiber bundles onto the liner L (i.e., winds the fiber bundles in a direction substantially perpendicular to the axial direction of the liner L). The hoop winding unit 30 includes a main body 31 and a rotating member 32. The main body 31 is provided on the rails 16 and supports the rotating member 32 to be rotatable about the axis of the liner L. The rotating member 32 is a disc-shaped member. At a central portion in the radial direction of the rotating member 32, a circular passing hole 34 is formed to allow the liner L to pass therethrough. Bobbins 33 on each of which a fiber bundle is wound are attached to the hoop winding unit 30. The bobbins 33 are provided at regular intervals in the circumferential direction of the rotating member 32.

As shown in FIG. 4, the hoop winding unit 30 includes a moving motor 35 that moves the hoop winding unit 30 in the front-rear direction along the rails 16 and a rotating motor 36 that rotates the rotating member 32. The moving motor 35 and the rotating motor 36 are controlled by the controller 5. The controller 5 rotates the rotating member 32 while reciprocating the hoop winding unit 30 along the rails 16 so that the liner L passes through the passing hole 34 in a relative manner. As a result, the bobbins 33 revolve about the axis of the liner L, and the fiber bundles are taken out from the bobbins 33. The fiber bundles having been taken out are simultaneously hoop-wound onto the surface of the liner L.

The helical winding unit 40 helical-winds the fiber bundles onto the liner L (i.e., winds the fiber bundles in a direction substantially parallel to the axial direction of the liner L). As shown in FIGS. 2, 3A and 3B, the helical winding unit 40 includes a main body 41, guide rollers 42, guide members 43, and a tension applying member (not illustrated) which applies a predetermined tension to the fiber bundles.

Figure 5:
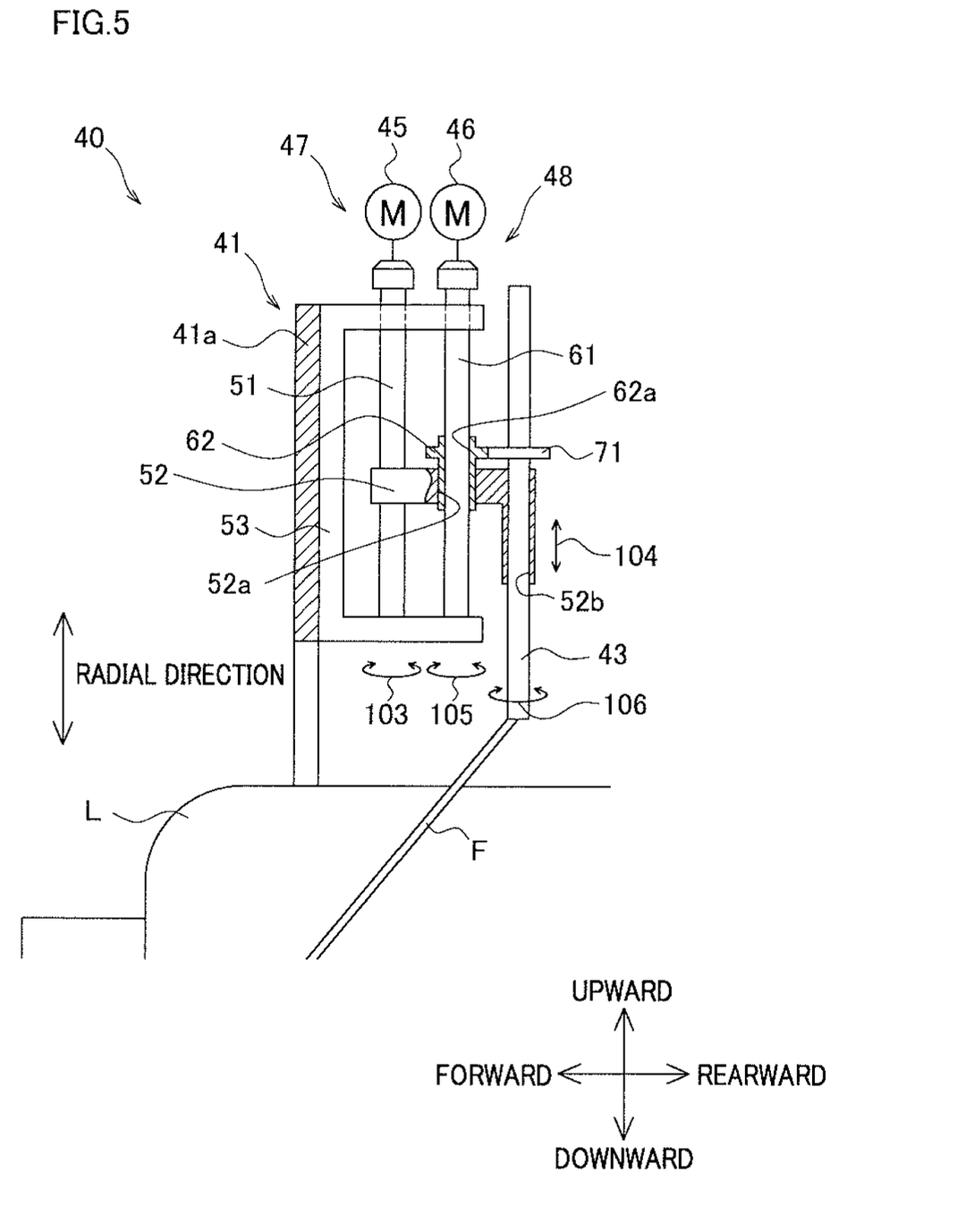
FIG. 5 is a cross section taken along a line V-V in FIG. 3A.

The main body 41 is provided to stand on the base 15. At a central portion in the left-right direction of the main body 41, a circular passing hole 44 is formed to allow the liner L to pass therethrough in the front-rear direction. The guide rollers 42 and the guide members 43 are provided along the circumference of the passing hole 44. Fiber bundles F as shown in FIGS. 3A and 3B and taken out from the bobbins B at the creel stand 3 are led to the guide members 43 via the guide rollers 42. The guide members 43 extend along the radial direction of the liner L, and guide the fiber bundles F inward in the radial direction from the outer side. The guide members 43 are movable in the radial direction of the liner L as shown by arrow 101 in FIG. 3B, by a later-described movement mechanism 47 as shown in FIG. 5. Each of the guide members 43 is rotatable by a later-described rotation mechanism 48 as shown in FIG. 5 about a rotational axis parallel to the longitudinal direction of the guide member 43 as shown by arrow 102 in FIG. 3B. The details of the guide members 43 will be given later.

As shown in FIG. 4, the helical winding unit 40 includes a guide moving motor 45 to move the guide members 43 and a guide rotating motor 46 to rotate the guide members 43. The guide moving motor 45 and the guide rotating motor 46 are controlled by the controller 5. The controller 5 moves the guide members 43 in the radial direction of the liner L in accordance with the outer shape of the liner L, while reciprocating the supporting units 20 along rails 16 so that the liner L passes through the passing hole 44. To be more specific, when the fiber bundles are helical-wound onto a dome portion of the liner L, the guide members 43 are radially moved toward the center so that the leading ends of the guide members 43 are close to the surface of the dome portion. With this arrangement, the fiber bundles F taken out from the guide members 43 run while being tensioned by the tension applying member (not illustrated), with the result that the fiber bundles F are simultaneously helical-wound onto the surface of the liner L as shown in FIGS. 3A and 3B.

To start winding the fiber bundles onto the liner L by the winder 2, for example, an operator fixes, e.g., tapes the yarn ends of the fiber bundles to the liner L. Alternatively, an apparatus that automatically fixes the yarn ends of the fiber bundles may be used. After fixation of the yarn ends of the fiber bundles to the liner L, the controller 5 drives the motors 24, 25, 35, 36, 45, and 46 as shown in FIG. 4 so that, to the liner L supported by the supporting units 20, hoop-winding is performed by the hoop winding unit 30 and helical-winding is performed by the helical winding unit 40.

Movement Mechanism and Rotation Mechanism of Helical Winding Unit

The following will describe the movement mechanism 47 and the rotation mechanism 48 of the helical winding unit 40 with reference to FIG. 5. FIG. 5 is a cross section taken along a line V-V in FIG. 3A.

As shown in FIG. 5, the movement mechanism 47 includes, for example, a spiral shaft 51, a ball nut 52, and the above-described guide moving motor 45. The spiral shaft 51 has a male screw thereon. The spiral shaft 51 extends in radial direction of the liner L and is rotatably supported by a supporting member 53 attached to the rear surface of a front end portion 41a of the main body 41. The spiral shaft 51 is rotationally driven by the guide moving motor 45. The ball nut 52 is a generally L-shaped member. A female screw is formed on a front part of the ball nut 52 to be screwed with the spiral shaft 51. A through hole 52a into which a later-described rotational shaft 61 can be inserted is formed in a central portion in the front-rear direction of the ball nut 52. A through hole 52b into which a guide member 43 can be inserted is formed in a rear part in the front-rear direction of the ball nut 52.

In the movement mechanism 47, the guide moving motor 45 rotationally drives the spiral shaft 51 as shown by arrow 103 in FIG. 5. As the spiral shaft 51 rotates, the ball nut 52 screwed with the spiral shaft 51 moves in the radial direction of the liner L, and hence the guide member 43 moves together with the ball nut 52 as shown by arrow 104 in FIG. 5.

The rotation mechanism 48 includes, for example, a rotational shaft 61, a gear 62 into which the rotational shaft 61 is inserted, and the above-described guide rotating motor 46. The rotational shaft 61 is, for example, a spline shaft. The rotational shaft 61 is inserted into the through hole 52a of the ball nut 52, extends in the radial direction of the liner L, and is rotatably supported by the supporting member 53. The rotational shaft 61 is rotationally driven by the above-described guide rotating motor 46. The gear 62 is a gear with a spline hole 62a. The gear 62 is rotatable together with the rotational shaft 61 and slidable along the axial direction of the rotational shaft 61. The gear 62 is loosely fit in the through hole 52a and rotatable with respect to the ball nut 52. The gear 62 is supported to be movable together with the ball nut 52 in the radial direction of the liner L.

The guide member 43 is inserted into the through hole 52b, rotatably supported by the ball nut 52, and movable together with the ball nut 52 in the radial direction. A gear 71 is fixed to the guide member 43 to be meshed with the gear 62 of the rotation mechanism 48.

In the rotation mechanism 48, as the guide rotating motor 46 rotationally drives the rotational shaft 61 as shown by arrow 105 in FIG. 5, the gear 62 rotates together with the rotational shaft 61. As the gear 71 meshed with the gear 62 rotates and the guide member 43 rotates about the rotational axis which is parallel to the longitudinal direction of the guide member 43 as shown by arrow 106 in FIG. 5.

A known guide member is C-shaped in cross section and has an internal space which is open to the outside. For this reason, in the helical winding unit 40, the following arrangement is employed to prevent a running fiber bundle F from dropping off from the guide member. In accordance with the winding direction of the fiber bundle F (i.e., the moving direction of the liner L), the winding angle, and so forth, the controller 5 controls the guide rotating motor 46. In this regard, as the rotation mechanism 48 driven by the guide rotating motor 46 rotates the guide member, lift up of the fiber bundle F from the guide member is suppressed. However, when, for example, there is a failure in the control, the fiber bundle F may be lifted up from the guide member and drop off. To suppress the lift up of the fiber bundle F, the guide member 43 has an arrangement described below.

Details of Arrangement of the Guide Member

Figure 6:
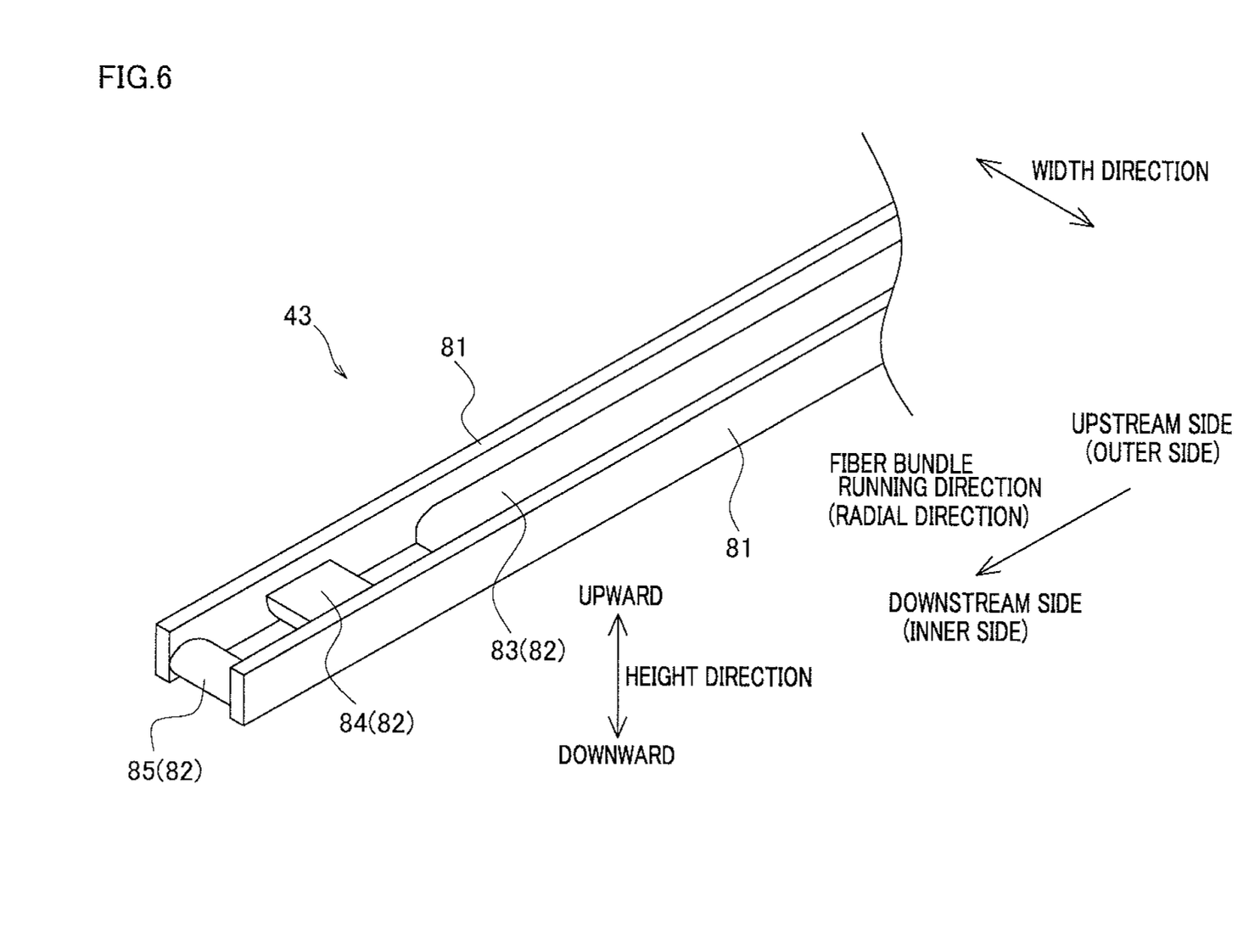
FIG. 6 is a perspective view of a guide member.
Figure 7A:
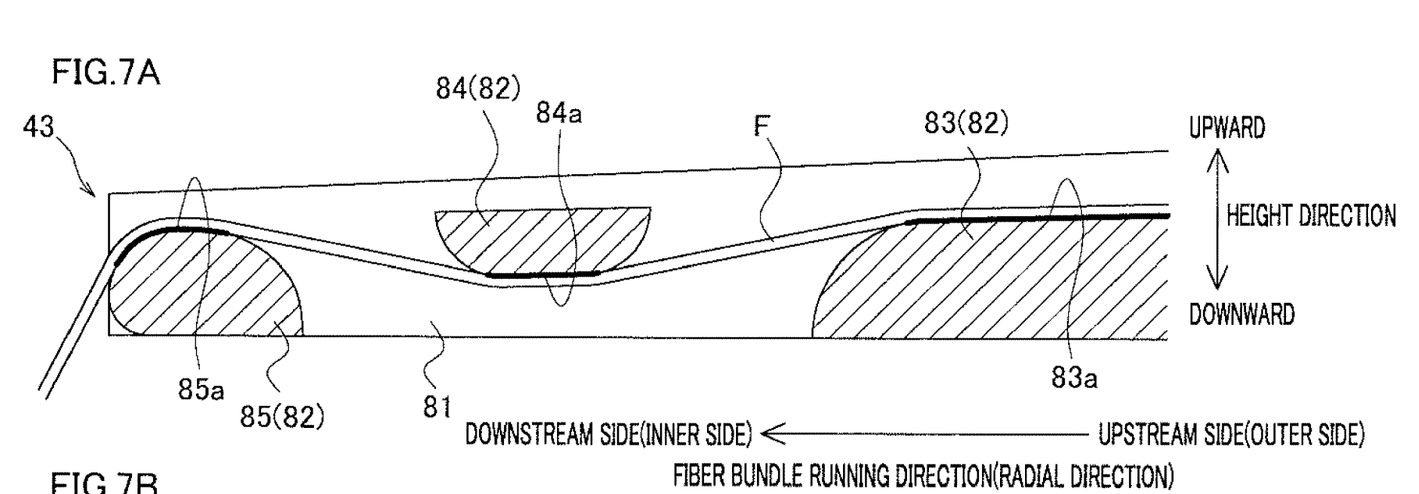
FIGS. 7A and 7B each show a cross section of a downstream part of the guide member.
Figure 7B:
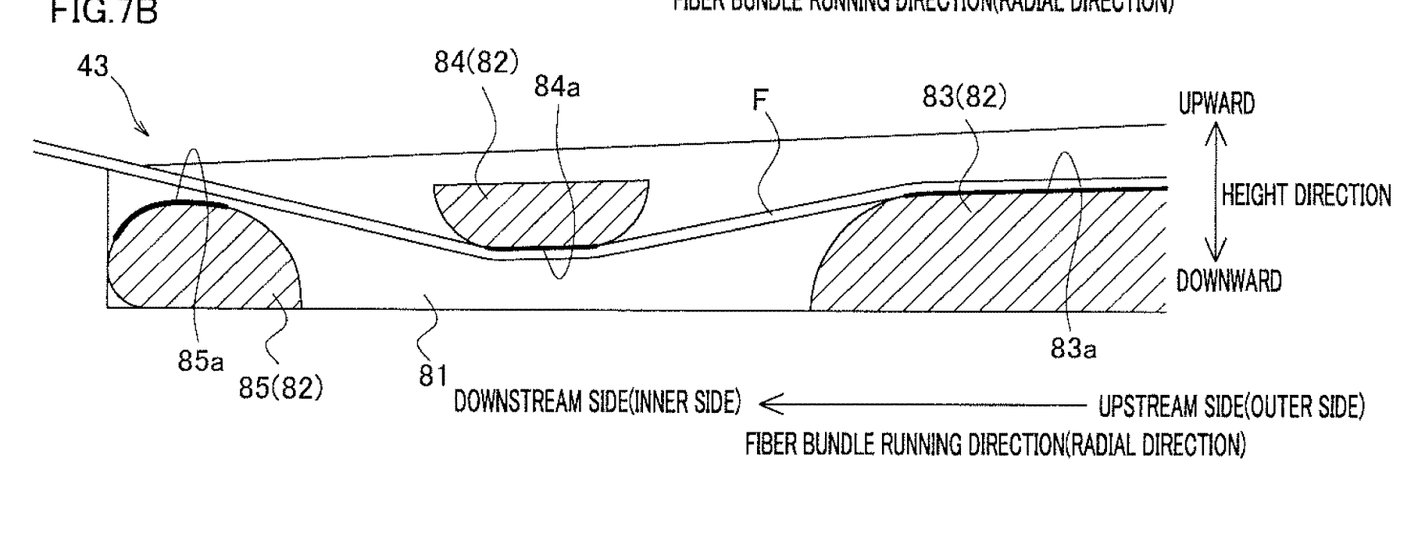

The details of the arrangement of the guide member 43 will be described with reference to FIGS. 6, 7A and 7B. FIG. 6 is a perspective view of the guide member 43. Each of FIGS. 7A and 7B is a cross section of the guide member 43, which is taken along the direction orthogonal to the width direction shown in FIG. 6. FIG. 7A shows a state in which the fiber bundle F runs normally, whereas FIG. 7B shows a state in which the fiber bundle F is about to be lifted up from the guide member 43.

As shown in FIGS. 6, 7A and 7B, the guide member 43 includes two side walls 81 and three guide portions 82. The longitudinal direction of the two side walls 81 is a fiber bundle running direction in which the fiber bundle runs (in the guide member 43, the fiber bundle running direction is identical with the radial direction of the liner L). Hereinafter, the upstream and downstream in the fiber bundle running direction will be simply referred to as upstream and downstream. The direction in which the two side walls 81 is aligned is the width direction of the guide member 43. The direction orthogonal to both the radial direction of the liner L and the width direction of the guide member 43 is the height direction of the two side walls (hereinafter, this direction will be simply referred to as height direction). For convenience, upward (one side) and downward (the other side) in the height direction are defined as shown in FIGS. 6, 7A and 7B. In the descriptions below, upward and downward indicate upward and downward in the height direction, respectively. These directions, however, may not indicate the direction in which the gravity acts.

The guide member 43 guides the fiber bundle F to the downstream side by the three guide portions 82 provided between the two side walls 81 (i.e., a first guide portion 83, a second guide portion 84, and a third guide portion 85 which will be detailed later). The guide member 43 is, for example, a member made of steel (e.g., carbon steel or alloy steel), in which the two side walls 81 and the three guide portions 82 are integrally formed. For example, the guide member 43 is manufactured by cutting a single rod-shaped component. The guide member 43 may be integrally formed by molding. A part of the guide member 43, which is upstream of the part shown in FIGS. 6, 7A and 7B, is curved to have an arc shape in cross section cut along the direction orthogonal to the longitudinal direction, to allow the guide member 43 to smoothly rotate inside the through hole 52b of the ball nut 52 of the above-described movement mechanism 47.

The two side walls 81 prevent the fiber bundle F from dropping off in the width direction and fix the three guide portions 82. The two side walls 81 are aligned and oppose each other in the width direction, and extend along the fiber bundle running direction to be parallel to each other. The height of each of the two side walls 81 in the height direction gradually decreases toward the downstream side (i.e., inward in the radial direction of the liner) as shown in FIGS. 7A and 7B. The height in the height direction of the downstream end portion of each of the two side walls 81 is, for example, about 5 millimeters. The length in the width direction of the guide member 43 is determined by the interval between the two side walls 81 in the width direction, and the height in the height direction of the guide member 43 is determined by the height in the height direction of each of the two side walls 81. The height in the height direction of the guide member 43 is shorter than the length in the width direction of the guide member 43 as shown in FIG. 6.

The first guide portion 83 is a part is provided between the two side walls 81 and fixed to the two side walls 81. The first guide portion 83 extends from the upstream end portion of each of the two side walls 81 to a part downstream of the central part of each of the two side walls 81, in the fiber bundle running direction. In other words, the first guide portion 83 extends over at least a half of the area of the guide member 43 in the fiber bundle running direction.

On the upper surface of the first guide portion 83, a first guide surface 83*a* (indicated by a thick line in each of FIGS. 7A and 7B) is formed. The running fiber bundle F makes contact with this first guide surface 83*a*. The first guide surface 83*a* faces up. In other words, in the fiber bundle running direction, the part where the first guide surface 83*a* is formed is open to the outside upward. The downstream end portion of the first guide portion 83 is smoothly curved downward toward the downstream side. This prevents the fiber bundle F from being scratched by the corner portion when the fiber bundle F leaves the first guide portion. Although not illustrated, the first guide surface 83*a* is linear in shape in cross section cut along the direction orthogonal to the longitudinal direction.

Being similar to the first guide portion 83, the second guide portion 84 is a part fixed between the two side walls 81. The second guide portion 84 is generally trapezoidal in shape in cross section cut along the width direction as shown in FIGS. 7A and 7B. The second guide portion 84 is provided downstream of the first guide portion 83. Between the first guide portion 83 and the second guide portion 84, a space where the fiber bundle F is allowed to pass through is formed. In the height direction, the second guide portion 84 is partially overlapped with the first guide portion 83.

On the lower surface of the second guide portion 84, a second guide surface 84*a* (indicated by a thick line in each of FIGS. 7A and 7B) is formed. The running fiber bundle F makes contact with this second guide surface 84*a*. The second guide surface 84*a* faces down. In other words, the second guide surface 84*a* and the first guide surface 83*a* are formed to be oriented in opposite directions. In the height direction, the second guide surface 84*a* is provided below the first guide surface 83*a*. The both end portions in the fiber bundle running direction of the second guide portion 84 are smoothly curved. To be more specific, the upstream end portion of the second guide portion 84 is curved upward toward the upstream side. Meanwhile, the downstream end portion of the second guide portion 84 is curved upward toward the downstream side. Although not illustrated, the second guide surface 84*a* is linear in shape in cross section cut along the direction orthogonal to the longitudinal direction.

Being similar to the first guide portion 83 and the second guide portion 84, the third guide portion 85 is a part fixed between the two side walls 81. The third guide portion 85 is generally elliptical in shape in cross section cut along the width direction as shown in FIGS. 7A and 7B. The third guide portion 85 is provided downstream of the second guide portion 84 and is fixed to the downstream end portions of the two side walls 81. Between the second guide portion 84 and the third guide portion 85, a space where the fiber bundle F is allowed to pass through is formed. In the height direction, the third guide portion 85 is partially overlapped with the first guide portion 83 and the second guide portion 84.

On the upper surface of the third guide portion 85, a third guide surface 85*a* (indicated by a thick line in each of FIGS. 7A and 7B) is formed. The running fiber bundle F makes contact with this third guide surface 85*a*. In other words, the third guide surface 85*a* faces up in the same manner as the first guide surface 83*a*. The third guide surface 85*a* is provided above the second guide surface 84*a* in the height direction. The both end portions in the fiber bundle running direction of the third guide portion 85 are smoothly curved in the same manner as in the second guide portion 84. To be more specific, the upstream end portion of the third guide portion 85 is curved downward toward the upstream side. Meanwhile, the downstream end portion of the third guide portion 85 is curved downward toward the downstream side. Although not illustrated, the third guide surface 85*a* is linear in shape in cross section cut along the direction orthogonal to the longitudinal direction.

As described above, the guide member 43 is formed by fixing the three guide portions 82 to the two side walls 81. In other words, the first guide portion 83, the second guide portion 84, and the third guide portion 85 are not rotating members such as rollers. Furthermore, when viewed in the longitudinal direction, the first guide portion 83, the second guide portion 84, and the third guide portion 85 are partially overlapped with one another in the height direction. The guide member 43 is therefore short in the height direction.
Prevention of Drop Off of Fiber Bundle by the Guide Member The following will describe how the guide member 43 having the structure described above prevents the fiber bundle F from dropping off with reference to FIGS. 7A and 7B.

As shown in FIG. 7A, the fiber bundle F is guided to the downstream side by the first guide portion 83, the second guide portion 84, and the third guide portion 85 provided in this order from the upstream side. To be more specific, to begin, the fiber bundle F runs while being in contact with the first guide surface 83*a*. Subsequently, the fiber bundle F leaves the first guide surface 83*a* and reaches the second guide portion 84 on the downstream side, and then runs while being in contact with the second guide surface 84*a*. The fiber bundle F then leaves the second guide surface 84*a* and reaches the third guide portion 85 on the downstream side, and then runs while being in contact with the third guide surface 85*a*. As such, the fiber bundle F is guided in a slightly meandering manner from the first guide surface 83*a* to the third guide surface 85*a*. After leaving the third guide surface 85*a*, the fiber bundle F runs further toward the downstream side (i.e., toward the liner).

Because the end portions in the fiber bundle running direction of the first guide portion 83, the second guide portion 84, and the third guide portion 85 are curved, the fiber bundle F runs smoothly when leaving each guide portion and when reaching each guide portion. Furthermore, a predetermined tension is applied by the tension applying member (not illustrated) to the running fiber bundle F. The fiber bundle F which runs while being in contact with each guide surface is therefore widened. The widened fiber bundle is wound onto the liner L.

In connection with the above, the controller 5 as shown in FIG. 4 adjusts the rotational angle of the guide member 43 so that the fiber bundle F runs while always being in contact with the third guide surface 85*a* as shown in FIG. 7A. To be more specific, as described above, the controller 5 controls the guide rotating motor 46 to rotate the guide member 43 in accordance with the winding direction of the fiber bundle F. However, when, for example, there is a failure in the control, the fiber bundle F may be lifted up upward from the third guide surface 85*a* as shown in FIG. 7B. Even if the fiber bundle F is lifted upward, further lift-up of this fiber bundle F upward is suppressed by the second guide surface 84*a* which is provided above the fiber bundle F. This prevents the fiber bundle F from dropping off upward. Meanwhile, when the fiber bundle F is lifted up from the second guide surface 84*a* for some reason, the first guide surface 83*a* and the third guide surface 85*a* prevent the fiber bundle F from dropping off downward. In the width direction, the two side walls 81 prevent the fiber bundle F from dropping off.

The height in the height direction of the guide member 43 is shorter than the length in the width direction of the guide member 43. For this reason, when the guide members 43 are gathered to the inner side in the radial direction as shown in FIG. 3B, each guide member 43 is rotated so that the height direction of the side walls 81 of the guide member 43 is along the circumferential direction of the liner L. As a result, the guide members 43 are less likely to interference with each other. Furthermore, because the height of each of the two side walls 81 in the height direction gradually decreases toward the downstream side (i.e., inward in the radial direction of the liner), the guide members 43 are further less likely to interfere with each other as compared to when the two side walls 81 are consistent in height in the height direction.

As described above, the fiber bundle F is guided while being in contact with the first guide surface 83*a*, the second guide surface 84*a* formed to be oriented in the opposite direction to the first guide surface 83*a*, and the third guide surface 85*a* formed to be oriented in the same direction as the first guide surface 83*a*. Because of this arrangement, even if the running fiber bundle F is lifted up upward, the lift-up of the fiber bundle F is suppressed by the second guide surface 84*a*, with the result that the drop-off of the fiber bundle F is prevented. Meanwhile, when the fiber bundle F is lifted up from the second guide surface 84*a*, the lift-up of the fiber bundle F is suppressed by the first guide surface 83*a* and the third guide surface 85*a*, with the result that the drop-off of the fiber bundle F is prevented. In the width direction, the two side walls 81 prevent the fiber bundle F from dropping off. Furthermore, because the guide portions 82 are disposed to be at least partially overlapped with one another, the height of the side walls 81 is advantageously low in the height direction.

In addition to the above, the guide portions 82 are fixed to the two side walls. In other words, the guide portions are not rollers rotated by the running fiber bundle. The height of each guide portion 82 is therefore advantageously low in the height direction.

Because of the above, it is possible to prevent the running fiber bundle F from dropping off from the guide member 43, while preventing increase in size of the guide member 43.

When a guide portion 82 is a roller, if at least one of fibers constituting a fiber bundle F is cut, the fiber may be disadvantageously wound onto the roller. Furthermore, the rotational shaft needs to be thin, and the strength of the guide member 43 may be deteriorated. The occurrence of this problem is prevented because the guide portions 82 are fixed to the two side walls.

In addition to the above, the downstream end portion of the first guide portion 83 is smoothly curved downward toward the downstream side. The fiber bundle F is therefore allowed to smoothly run toward the second guide portion 84, along the curved surface of the downstream end portion of the first guide portion 83. On this account, the fiber bundle F is less likely to be damaged when the fiber bundle F moves from the first guide portion 83 to the second guide portion 84.

In addition to the above, the both end portions in the fiber bundle running direction of the second guide portion 84 are smoothly curved. On this account, the fiber bundle F is allowed to smoothly run along the curved surface when reaching the upstream end portion of the second guide portion 84 or when leaving the downstream end portion of the second guide portion 84, with the result that the fiber bundle is less likely to be damaged.

In addition to the above, the second guide surface 84*a* is oriented in the opposite direction to the first guide surface 83*a* in the height direction, and is provided below the first guide surface 83*a*. Furthermore, the third guide surface 85*a* is oriented in the opposite direction to the second guide surface 84*a* in the height direction, and provided above the second guide surface 84*a*. The fiber bundle F is therefore guided in a slightly meandering manner from the first guide portion 83 to the third guide portion 85. On this account, the fiber bundle stably runs.

In addition to the above, the both end portions in the fiber bundle running direction of the third guide portion 85 are smoothly curved. On this account, the fiber bundle F is allowed to smoothly run along the curved surface when reaching the upstream end portion of the third guide portion 85 or when leaving the downstream end portion of the third guide portion 85, with the result that the fiber bundle is less likely to be damaged.

In addition to the above, the height of each of the two side walls 81 in the height direction decreases toward the downstream side (i.e., inward in the radial direction of the liner). For this reason, when the guide members 43 are gathered by the movement mechanism 47 to the inner side in the radial direction, each guide member 43 is rotated by the rotation mechanism 48 so that the height direction of the side walls 81 of the guide member 43 is along the circumferential direction of the liner L. As a result, the guide members 43 are further less likely to interference with each other.

In addition to the above, the guide members 43 are made of steel and have high strength and rigidity. For this reason, even if the tension of the fiber bundle F acts on the guide member 43, the guide member 43 is less likely to be damaged, thanks to the high strength. Furthermore, because the guide member 43 is less likely to warp thanks to the high rigidity, interference between the guide members 43 is suppressed.

In addition to the above, the guide portions 82 are integrally formed with the two side walls 81. (In other words, there are no joints between these portions.) The strength of the guide member 43 is therefore high compared to a guide member 43 formed by adhesion, welding or the like (i.e., having joints).

The following will describe modifications of the above-described example. The members identical with those in the example above will be denoted by the same reference numerals and the explanations thereof are not repeated.

Figure 8:
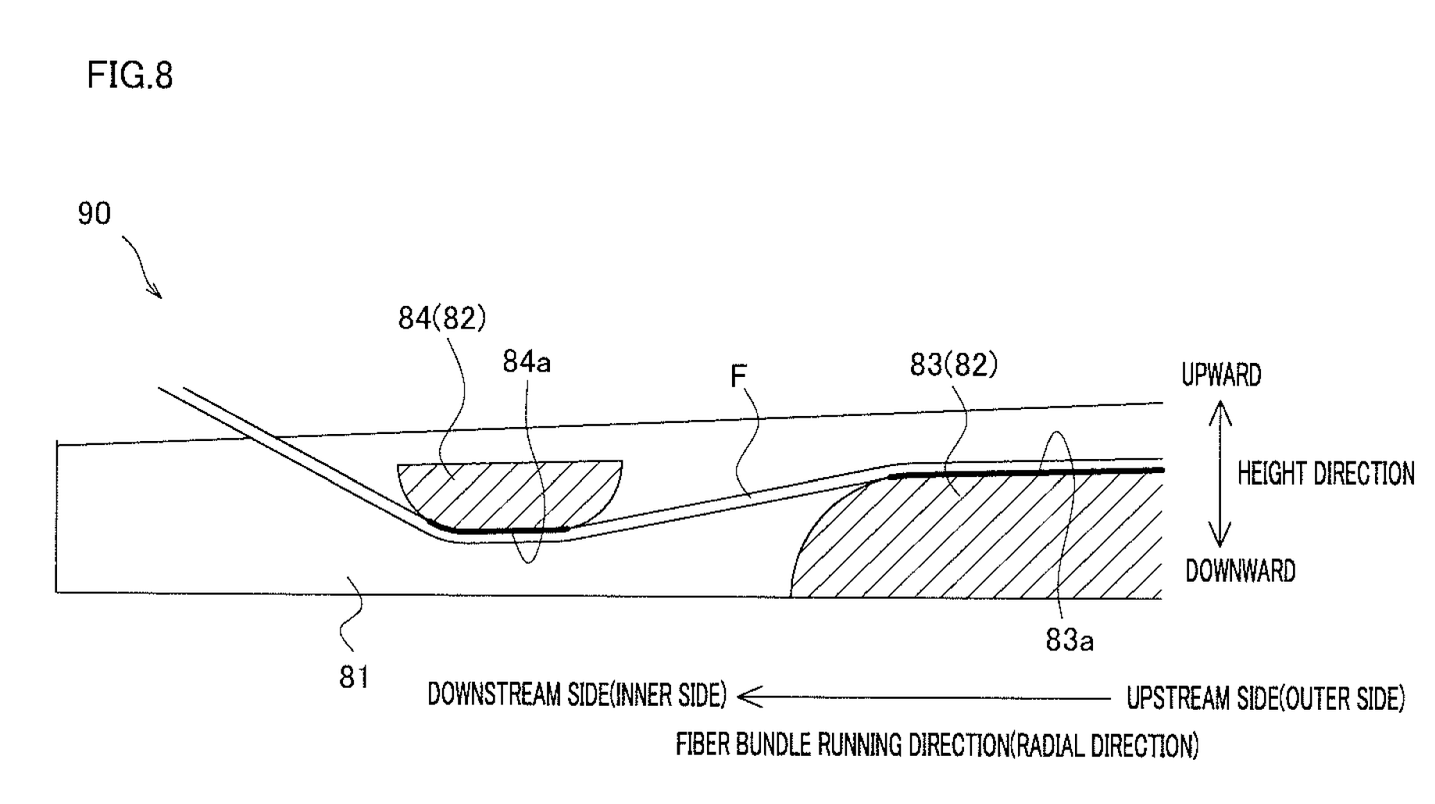
FIG. 8 is a cross section of a downstream part of a guide member in a modification.

(1) While in the example above the guide member 43 is provided with the first guide portion 83, the second guide portion 84, and the third guide portion 85 as the guide portions 82, this disclosure is not limited to this arrangement. As shown in FIG. 8, in a guide member 90, only two portions, i.e., a first guide portion 83 and a second guide portion 84 may be provided as guide portions 82. Also in this arrangement, when a fiber bundle F is lifted up upward, the second guide surface 84*a* prevents the fiber bundle F from dropping off upward. Meanwhile, when the fiber bundle F moves downward, the first guide surface 83*a* prevents the fiber bundle F from dropping off downward. In this way, the drop-off of the fiber bundle F is prevented while the structure of the guide member is simplified.

(2) While in the example above the end portions in the fiber bundle running direction of each guide portion 82 of the guide member 43 are curved, the disclosure is not limited to this arrangement. For example, the end portions of each guide portion may be tapered.

(3) While in the example above the height in the height direction of the side walls 81 of the guide member 43 decreases toward the downstream side, the disclosure is not limited to this arrangement. For example, the height in the height direction of the side walls 81 may be constant.

(4) The guide members 43 may not be made of steel, and may be members having strength sufficient not to be damaged by, for example, the tension applied to the fiber bundle F.

(5) The two side walls 81 and the guide portions 82 of the guide member 43 may not be integrally formed. For example, the guide portions 82 may be fixed to the two side walls 81 by welding, adhesion or the like.

The invention claimed is:

1. A filament winding apparatus comprising:
   a helical winding head configured to helical-wind fiber bundles onto a liner, the helical winding head including:
      guide members that extend in radial directions of the liner in a radial manner and guide the respective fiber bundles to the liner; a movement mechanism configured to move each of the guide members in the radial direction; and a rotation mechanism configured to rotate each of the guide members about an axis parallel to a direction in which each of the guide members extends, each of the guide members including:
      two side walls that oppose each other and extend in the radial direction; and
      guide portions fixed between the two side walls, a running fiber bundle in contact with the guide portions,
   the guide portions including:
      a first guide portion in which a first guide surface is formed, the running fiber bundle in contact with the first guide surface; and
      a second guide portion in which a second guide surface is formed, the running fiber bundle in contact with the second guide surface and the second guide portion being downstream of the first guide portion in a fiber bundle running direction,
      a direction orthogonal to a longitudinal direction of the side walls being defined as a height direction of the side walls,
      the first and second guide portions at least partially overlap in the height direction of the two side walls such that the fiber bundles constantly contact the first guide portion and the second guide portion and thus guide the fiber bundles while being wound,
      the first guide surface being oriented to one side in the height direction, and
      the second guide surface being oriented to the other side in the height direction and provided on the other side of the first guide surface in the height direction.

2. The filament winding apparatus according to claim 1, wherein a downstream end portion in the fiber bundle running direction of the first guide portion is curved toward the downstream side in the fiber bundle running direction.

3. The filament winding apparatus according to claim 2, wherein an upstream end portion in the fiber bundle running direction of the second guide portion is curved toward the upstream side, and
   a downstream end portion in the fiber bundle running direction of the second guide portion is curved toward the downstream side.

4. The filament winding apparatus according to claim 2, wherein the guide portions further include
   a third guide portion in which a third guide surface is formed, the running fiber bundle in contact with the third guide surface and the third guide portion being downstream of the second guide portion in the fiber bundle running direction,
   the third guide surface oriented to the one side in the height direction and provided on the one side of the second guide surface in the height direction.

5. The filament winding apparatus according to claim 2, wherein the height of each of the two side walls in the height direction decreases inward in the radial direction.

6. The filament winding apparatus according to claim 2, wherein the guide members are made of steel.

7. The filament winding apparatus according to claim 1, wherein an upstream end portion in the fiber bundle running direction of the second guide portion is curved toward the upstream side, and
   a downstream end portion in the fiber bundle running direction of the second guide portion is curved toward the downstream side.

8. The filament winding apparatus according to claim 7, wherein the guide portions further include
   a third guide portion in which a third guide surface is formed, the running fiber bundle in contact with the third guide surface and the third guide portion being downstream of the second guide portion in the fiber bundle running direction,
   the third guide surface oriented to the one side in the height direction and provided on the one side of the second guide surface in the height direction.

9. The filament winding apparatus according to claim 7, wherein the height of each of the two side walls in the height direction decreases inward in the radial direction.

10. The filament winding apparatus according to claim 7, wherein the guide members are made of steel.

11. The filament winding apparatus according to claim 1, wherein the guide portions further include
    a third guide portion in which a third guide surface is formed, the running fiber bundle in contact with the third guide surface and the third guide portion being downstream of the second guide portion in the fiber bundle running direction,
    the third guide surface oriented to the one side in the height direction and provided on the one side of the second guide surface in the height direction.

12. The filament winding apparatus according to claim 11,
wherein an upstream end portion in the fiber bundle running direction of the third guide portion is curved toward the upstream side, and
a downstream end portion in the fiber bundle running direction of the third guide portion is curved toward the downstream side.

13. The filament winding apparatus according to claim 11, wherein the height of each of the two side walls in the height direction decreases inward in the radial direction.

14. The filament winding apparatus according to claim 11, wherein the guide members are made of steel.

15. The filament winding apparatus according to claim 12, wherein the height of each of the two side walls in the height direction decreases inward in the radial direction.

16. The filament winding apparatus according to claim 12, wherein the guide members are made of steel.

17. The filament winding apparatus according to claim 1, wherein the height of each of the two side walls in the height direction decreases inward in the radial direction.

18. The filament winding apparatus according to claim 17, wherein the guide members are made of steel.

19. The filament winding apparatus according to claim 1, wherein the guide members are made of steel.

20. The filament winding apparatus according to claim 1, wherein the guide portions are integrally formed with the two side walls.

\* \* \* \* \*